use006448298B1

(12) United States Patent
Romualdo et al.

(10) Patent No.: US 6,448,298 B1
(45) Date of Patent: *Sep. 10, 2002

(54) DEFOAMER AND METHODS OF USE THEREOF

(75) Inventors: Raimundo Romualdo, São Paulo; Claudio Cândido Luiz, Cotia; Luiz Antonio Fernandes, São Paulo, all of (BR)

(73) Assignee: BetzDearborn, Inc., Trevose, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,743

(22) Filed: May 15, 2000

Related U.S. Application Data

(63) Continuation of application No. 09/066,639, filed on Apr. 24, 1998, now Pat. No. 6,083,998.

(51) Int. Cl.[7] .............................. B01D 19/04; C09K 3/00
(52) U.S. Cl. ........................ 516/117; 435/161; 435/812; 516/118; 516/119; 516/904
(58) Field of Search ................................ 516/117, 118, 516/119, 909, 904; 435/812

(56) References Cited

U.S. PATENT DOCUMENTS

| 2,702,793 | A | 2/1955 | Smith .......................... 252/78 |
|---|---|---|---|
| 2,862,885 | A | 12/1958 | Nelson et al. ............... 508/207 |
| 3,700,587 | A | 10/1972 | Hyde .......................... 208/131 |
| 3,784,479 | A | 1/1974 | Keil ............................ 516/118 |
| 3,959,175 | A | 5/1976 | Smith, Jr. et al. ........... 516/115 |
| 3,984,347 | A | 10/1976 | Keil ............................ 516/118 |
| 4,005,044 | A | 1/1977 | Raleigh ........................ 516/74 |
| 4,082,690 | A | 4/1978 | Farminer .................... 516/123 |
| 4,274,977 | A | 6/1981 | Koerner et al. ............. 516/117 |
| 4,329,528 | A | 5/1982 | Evans ........................... 585/3 |
| 4,395,352 | A | 7/1983 | Kulkarni et al. ........ 516/117 X |
| 4,961,840 | A | 10/1990 | Goyal ......................... 208/131 |
| 5,283,004 | A | 2/1994 | Miura ......................... 516/117 |
| 5,288,789 | A | 2/1994 | McCarthy ................... 435/243 |
| 5,431,853 | A | 7/1995 | Tsuda et al. ................. 516/118 |
| 5,843,734 | A | 12/1998 | Shonaka et al. ........ 435/812 X |
| 6,083,998 | A | * | 7/2000 | Romualdo et al. .......... 516/117 |

FOREIGN PATENT DOCUMENTS

WO         97/00942        1/1997

* cited by examiner

Primary Examiner—Richard D. Lovering
(74) Attorney, Agent, or Firm—Greenblum & Bernstein, P.L.C.

(57) ABSTRACT

Disclosed are methods and compositions for defoaming alcoholic fermentations. An aqueous composition of polydimethylsiloxane, an ethylene oxide/propylene oxide block copolymer and a silicone/silica blend is employed to treat the fermentation for foaming.

6 Claims, No Drawings

DEFOAMER AND METHODS OF USE THEREOF

CROSS-REFERENCE TO RELATED APPLICATIONS

This application is a continuation of application Ser. No. 09/066,639, filed Apr. 24, 1998, now U.S. Pat. No. 6,083, 998. The entire disclosure of application Ser. No. 09/066, 639 is considered as being part of the disclosure of this application, and the entire disclosure of application Ser. No. 09/066,639 is expressly incorporated by reference herein in its entirety.

FIELD OF THE INVENTION

The present invention pertains to an improved water-based defoamer composition. The present invention more particularly relates to an improved water-based defoamer composition that has utility in the alcoholic fermentation of sugar cane juice and corn syrup.

BACKGROUND OF THE INVENTION

Antifoaming compositions are materials used in the prevention, removal and control of unwanted foam. Unwanted fluid foams are made up of numerous tiny bubbles of a mechanical or chemical origin which are generated within a liquid and which rise and accumulate at the liquid surface faster than they decay.

The field in which unwanted foams are encountered are diverse. Foam problems can be found in polymerization, paint process, papermaking processes, oil drilling and refining operations, food preparation and textile dyeing operations. Liquid coolants, hydraulic fluids, lubricants, aviation fuels and gas absorption systems may foam with undesirable results under conditions of operation. If not properly controlled, foam can reduce equipment capacity and increase processing time and expense, and in some instances, cause other dangers.

Although foam can be controlled in some instances by making changes to the process itself, or by using mechanical defoaming equipment, chemical antifoam formulations have proven effective and economical.

Distilleries which use molasses or sugar cane juice as raw materials for ethanol production face several operational problems. One of the more serious problems is foam generation during this fermentative process.

To allow sucrose fermentation, it is necessary to decompose it to fructose and glucose, which are simpler sugars, according to the reaction;

$$C_{12}H_{22}O_{11}+H_2O \rightarrow 2C_2H_5OH+2CO_2+56KCal$$

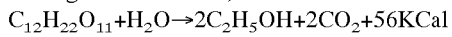

The components of the mixture under fermentation, composed mainly of sugars, electrolytes, proteins and acids, get concentrated in the air-liquid interface, generating an elastic foam.

The gases that are produced during the fermentation process due to their lower density relative to the liquid phase, rise to the surface and stretch the elastic film. As this film is relatively resistant to being broken, the gases remain in the top part of the liquid causing bubbles (i.e. foam) to form.

The formed foam must be rigorously controlled to avoid fermentation tank overflow, which could result in loss of broth, yeasts or ethanol.

The present inventors have discovered a water-based defoaming composition which has proven more effective than the synthetic wax and mineral oil based defoamers typically used in the fermentation industry.

SUMMARY OF THE INVENTION

The present invention provides for defoamer compositions having utility in alcoholic fermentations. The defoamer compositions are aqueous based and comprise polydimethylsiloxane oils, ethylene oxide/propylene oxide block copolymers and a silicone/silica blend.

DESCRIPTION OF THE RELATED ART

Polydimethylsiloxanes have been employed in non-aqueous mediums such as residual petroleum stocks and crude oils as defoamers as taught in U.S. Pat. Nos. 3,700,587 and 4,082,690. Liquid organosilicon condensations products or polymers in combination with silane have been taught in U.S. Pat. No. 2,702,793 as defoamers in oils and antifreezes. Polyvinylalkoxysilanes and polyvinylalkylalkoxysilanes are taught in U.S. Pat. No. 2,862,885 to control foaming in petroleum-type oils, particularly those in the lubricating oil viscosity range.

U.S. Pat. No. 3,959,175 teaches an aqueous defoamer composition containing liquid polybutene. The defoamer composition can further comprise in part hydrophobic silica and silicone oils. U.S. Pat. No. 5,288,789 teaches the use of a condensate of alkylphenol and aldehyde that has been polyoxyalkylated to reduce foam in a fermentation broth.

DETAILED DESCRIPTION OF THE INVENTION

The present invention provides for compositions and methods for defoaming alcoholic fermentations comprising a polydimethylsiloxane oil, an ethylene oxide/propylene oxide block copolymer and a silicone/silica blend in an aqueous solution. The methods comprise adding an effective defoaming amount of this composition to the alcoholic fermentation itself.

The polydimethylsiloxane oil is preferably selected from those having a viscosity average between about 300 and about 500 cSt (25° C.) and an average molecular weight ($MW_{avg}$) between about 20,000 and about 40,000 with a molecular weight of about 28,000 to about 30,000 preferred. These chemicals are available under the BAYSILONE OEL M and RHODORSYL tradenames from Bayer Corp. and Rhone Poulenc, respectively.

The ethylene oxide/propylene oxide (EO/PO) block copolymer preferably has a Brookfield RVT viscosity average between about 100 and about 600 mPa S and a Cloud Point average between about 20 and 50C. These compounds are available commercially from Dow Chemical under the Fluent Cane trademark.

The silicone/silica blend is preferably comprised of methylated silica and a dimethylsiloxane/silica reaction product in a weight ratio of 3.0% methylated silica to 27.0% dimethylsiloxane/silica reaction product and has a Brookfield RVT viscosity average between 1000 and 30,000 cps. These compounds are commercially available from Dow Corning as Dow Corning A and Dow Corning 3472, respectively.

For purposes of the present invention, the silicone/silica blend may be defined as a blend of a siloxane compound with a silica compound.

The composition may be prepared as an aqueous solution with the weight ratios of polydimethylsiloxane to EO/PO block copolymer to hydrophilic silica ranging from about 8:10:10. Preferably the weight ratio is 4:5:5.

Additional ingredients may also be added to the aqueous composition to stabilize the composition and improve the ability of the composition to disperse over the entire foam surface. Examples of these chemicals include, but are not limited to, polyether modified polysiloxane, xanthan gum, ethoxylated caster oil, glycerol monostearate, alcohol, sodium carbonate and glutaraldehyde. The key requirement being that the additional ingredients do not affect the yeasts thereby damaging the fermentation process.

The aqueous composition can be added to the fermentation process to be treated by any conventional means. For purposes of the present invention, the phrase "an effective defoaming amount" is defined as that amount of inventive composition which will control already formed foam.

This amount will vary based upon different parameters such as sugar juice composition, yeasts activity, temperature, feed velocity of the sugar juice/yeast blend from the fermentation tanks, etc. Preferably, this amount ranges from about 0.3 to about 1.0 gram per liter of produced ethanol.

For purposes of the present invention, the phrase "alcoholic fermentations" is meant to include sugar cane juice fermentation and corn syrup fermentation.

In order to more clearly illustrate this invention, the data set forth below were developed. The following examples are included as being illustrations of the invention and should not be construed as limiting the scope thereof.

EXAMPLES

To test the efficacy of the inventive composition as an antifoam, a standard foam knockdown test was employed. The general conditions of the test were as follows:

| | |
|---|---|
| Temperature | 35° C. |
| Total Time | 10 minutes |
| Air Flow | 2.0 L/Min |
| Sugar Juice/Yeasts Solution Ratio | 210 mL/140 mL |
| Brix of the Juice | 19 |
| Product Feed Ratio | 0.2 mL/L or 0.1 mL/L of juice and yeasts |

An air flowmeter was connected to a glass graduated column and set to the indicated flow ratio. A yeast in water solution was prepared as 1 part yeast per 2 parts water. The pH of the resulting solution was adjusted to 2.3 with $H_2SO_4$ (50%).

The juice and the aqueous yeast solution were then mixed in a 600 mL beaker in the indicated ratio. This mixture was then heated to the defined temperature. The heated mixture was then transferred to the graduated column under the air injection.

When the foam level reached 25 cm inside the column, the antifoam was added at the defined feed ratio by using a 1.0 mL plastic syringe while the timer was simultaneously turned on. The knock down effect of the product and the foam level were then recorded for the indicated times.

The results of this testing are presented in Table I.

The standard was composed of 3.0% ethylene bis stearamide, 80.0% of a mineral oil having 20% naphthenic carbons content, 15.0 to 20.0% aromatic carbons content and 62.0% paraffinic carbons content; and 15.0% EO/PO block copolymer. The remaining 2.0% are chemicals to stabilize and improve product application. These are the same as those listed in the Inventive Treatment A described below.

| | % (by weight) |
|---|---|
| Inventive Treatment A Components | |
| Polydimethylsiloxane Oil 500 CST (Baysilone OEL M 500/Rhodorsyl 47 V 500) | 1.75 |
| Polydimethylsiloxane Oil 12500 CST (Baysilone OEL M 12500/Rhodorsyl 47 V 12500) | 2.25 |
| Polydimethylsiloxane Oil 30000 CST (Baysilone OEL M 30000/Rhodorsyl 47 V 30000) | 4.00 |
| EO/PO Copolymer (Fluent Cane 152) | 5.20 |
| EO/PO Copolymer (Fluent Cane 120) | 8.00 |
| Silica hydrophobic silicone dioxide amorphous (Rhodorsyl R 972) | 0.80 |
| Stabilizers/Final Product Improvers | |
| Polyether modified polysiloxane (Tegopren 5863) | 1.00 |
| Xanthan Gum (Polysaccharide) | 0.10 |
| Ethoxylated Castor Oil (40 EO) (Surfon R 400) | 2.00 |
| Glycerol Monostearate | 0.50 |
| Synthetic Alcohol (20C) (Alfol 20 plus) | 2.00 |
| Water | 72.19 |
| Sodium Carbonate | 0.01 |
| Glutaraldehyde | 0.20 |

TABLE I

FOAM HEIGHT (cm)

| TIME | Standard (0.02% active) | Treatment A (0.02% active) | Standard (0.01% active) | Treatment A (0.01% active) |
|---|---|---|---|---|
| 0 | 25 | 25 | 25 | 25 |
| 5 | 24 | 18 | 23 | 20 |
| 10 | 15 | 15 | 18 | 17 |
| S 15 | 10 | 13 | 15 | 16 |
| E 20 | 9 | 9 | 10 | 14 |
| C 25 | 9 | 7 | 10 | 12 |
| O 30 | 9 | 7 | 10 | 10 |
| N 35 | 9 | 7 | 10 | 10 |
| D 40 | 9 | 7 | 10 | 9 |
| S 45 | 9 | 7 | 10 | 9 |
| 50 | 9 | 7 | 10 | 9 |
| 55 | 9 | 7 | 10 | 9 |
| 60 | 9 | 7 | 10 | 9 |
| M 2 | 12 | 7 | 12 | 10 |
| I 3 | 13 | 8 | 16 | 11 |
| N 4 | 14 | 8 | 17 | 12 |
| U 5 | | 9 | 17 | 12 |
| T 6 | 15 | 9 | 18 | 13 |
| E 8 | 15 | 10 | 19 | 14 |
| S 10 | 15 | 12 | 19 | 15 |
| 15 | 15 | 14 | 19 | 17 |

As demonstrated in Table I, the inventive treatment proved more effective as a defoamer in a sugar fermentation than the standard product which is currently at use in the fermentation field. This proved true at both 0.02% and 0.01% actives.

Further testing was performed with a different inventive treatment, B, which has the following formulation:

| | % (By Weight) |
|---|---|
| Inventive Treatment B Components | |
| Polydimethylsiioxane oil 500 cst (Baysilone Oil M 500/Rhodorsyl 47V500 | 4.00 |
| Silicone Compound (Dow Corning A) | 3.50 |
| Base DC 3472 (Dow Corning 3472) | 6.50 |

-continued

| | % (By Weight) |
|---|---|
| EO/PO copolymer (Fluent Cane 152) | 5.00 |
| EO/PO copolymer (Fluent Cane 120) | 5.50 |
| Stabilizers/Final Product Improvers | |
| Xanthan gum (polysaccharide) | 0.15 |
| Ethoxylated caster oil (40 EO) (Surfon R400) | 2.00 |
| Glycerol monostearate | 0.65 |
| Synthetic alcohol (20C) (Alfol 20 Plus) | 2.00 |
| Water | 70.49 |
| Sodium carbonate | 0.01 |
| Glutaraldehyde | 0.20 |

These components were blended in a stainless steel vessel with a steam jacket or coil and a stirrer with constant speed mechanism.

To test the efficacy of the inventive composition as an antifoam, a standard foam knockdown test was employed. The testing conditions were 5.0 hours total fermentation time at a temperature of 35° C. The sugar juice/yeasts solution ratio was 36 L/24 L and the brix of the juice was 19. The product feed ration was 0.02 ml/l of a mixture of sugar juice/yeasts solution.

The yeast solution was added to an 80 L fermentation tank graduated from 10 to 10 liters. The sugar juice was added to the fermentation tank under a feed ratio of 200 ml/minute. The time of initial fermentation is recorded as the initial time. The sugar juice feed ratio is kept constant and the height of the mixture of sugar juice/yeasts solution/formed foam was observed.

When the foam reached the 70 L mark inside the fermentation tank, 1.0 ml of antifoam was fed with a syringe. Every time the foam reached the 70 L level, 1.0 ml of antifoam was fed until the end of the fermentation process. The standard product was synthetic wax and mineral oil based. The results of this testing are presented in Table II.

TABLE II

| Fermentation Time (Minutes) | Volume of Product (ml) | |
|---|---|---|
| | Standard (Neat) | Inventive Treatment B (Neat) |
| 0 | 0.0 | 0.0 |
| 150 | 1.0 | 1.0 |
| 155 | 1.0 | — |
| 160 | 1.0 | — |
| 165 | 1.0 | — |
| 170 | 1.0 | — |

TABLE II-continued

| Fermentation Time (Minutes) | Volume of Product (ml) | |
|---|---|---|
| | Standard (Neat) | Inventive Treatment B (Neat) |
| 185 | 1.0 | — |
| 200 | 1.0 | — |
| 210 | 1.0 | — |
| 225 | 1.0 | — |
| 240 | 1.0 | — |
| 300 (End of Fermentation) | 1.0 | — |
| Total Volume of Addition | 10.0 | 1.0 |

The results of this testing demonstrate that the inventive composition was more effective than the traditional treatment at inhibiting foam formation in an alcoholic fermentation process.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. An aqueous composition comprising (A) a polydimethylsiloxane oil, (B) an ethylene oxide/propylene oxide block copolymer, and (C) a silicone/silica blend, and wherein the weight ratio of (A):(B):(C) is from about 8:10:10 to about 4:5:5.

2. The composition as claimed in claim 1 wherein said polydimethylsiloxane oil has an average viscosity of about 300 to about 500 cSt at 25° C.

3. The composition as claimed in claim 2 wherein said polydimethylsiloxane oil has an average molecular weight of about 20,000 to about 40,000.

4. The composition as claimed in claim 1 wherein said ethylene oxide/propylene oxide block copolymer has a Brookfield RVT viscosity average between about 100 and about 600 mPa S and A Cloud Point average between about 20 and 50° C.

5. The composition as claimed in claim 1 wherein said silicone/silica blend comprises a dimethylsiloxane-silica reaction product/methylated silica.

6. The composition as claimed in claim 1 wherein said composition further comprises polyether modified polysiloxane, xanthan gum, ethoxylated castor oil, glycerol monostearate, alcohol, sodium carbonate and glutaraldehyde.

* * * * *